United States Patent [19]
Auerbach et al.

[11] Patent Number: 4,948,824
[45] Date of Patent: Aug. 14, 1990

[54] ADHESIVE COMPOSITIONS

[75] Inventors: Robert A. Auerbach; George W. Watson, both of Erie, Pa.

[73] Assignee: Lord Corporation, Erie, Pa.

[21] Appl. No.: 333,738

[22] Filed: Mar. 17, 1989

Related U.S. Application Data

[63] Continuation of Ser. No. 30,124, Mar. 26, 1987, abandoned.

[51] Int. Cl.$^5$ ................................................ C08K 5/29
[52] U.S. Cl. .................................... 524/197; 525/124; 525/332.1
[58] Field of Search .............. 524/197; 525/124, 332.1

[56] References Cited

U.S. PATENT DOCUMENTS

| | | | |
|---|---|---|---|
| 2,459,742 | 1/1949 | Bradley et al. | 428/465 |
| 3,258,388 | 6/1966 | Coleman et al. | 156/333 |
| 3,282,883 | 11/1966 | DeCrease et al. | 204/168 |
| 3,824,217 | 7/1974 | Barker | 528/59 |
| 3,859,258 | 1/1975 | Manino | 525/129 |
| 4,442,259 | 4/1984 | Isgur et al. | 524/839 |
| 4,581,092 | 4/1986 | Westley | 156/309.6 |

FOREIGN PATENT DOCUMENTS

| | | |
|---|---|---|
| 0729596 | 3/1966 | Canada. |
| 0717085 | 2/1980 | U.S.S.R. . |

OTHER PUBLICATIONS

Hawley's Condensed Chemical Dictionary, 11th ed., p. 214.

*Primary Examiner*—Joseph L. Schofer
*Assistant Examiner*—Peter D. Mulcahy

[57] ABSTRACT

Compositions of matter based on the reaction product of a dioxime compound and a polyisocyanate compound, made by reacting the compounds in an inert organic liquid in such a proportion that the ratio of oxime groups to isocyanate groups in the reaction is greater than 2:1, and is preferably about 2.5:1. The reaction product may be used in an adhesive composition which further includes an elastomer with a degree of unsaturation of greater than two mole percent, which is preferably an ethylene-propylene-diene terpolymer, and which may further include a film-forming adjunct, an inert filler material, and an inert solvent. The adhesive composition, which does not require an oxidizing agent, may be made into a liquid adhesive composition by mixing with an inert organic liquid. The liquid adhesive composition may be used to bond rubber to metal, producing useful bonded and laminated articles, by coating at least one of the substrate surfaces to be bonded with the composition; bringing both substrate surfaces into contact with the composition layered therebetween; and maintaining contact under sufficient conditions of time, temperature, and pressure to effect bonding. Both cured and uncured rubbers may be bonded.

4 Claims, No Drawings

ADHESIVE COMPOSITIONS

This application is a continuation of application Ser. No. 030,124, filed Mar. 26, 1987, now abandoned.

FIELD OF THE INVENTION

This invention relates to adhesive systems. More particularly, this invention relates to an adhesion promoter capable of bonding diverse elastomers to substrate materials, and to methods for making that promoter; to the use of that promoter in adhesive compositions; to methods of making those adhesive compositions; to bonding methods which employ those compositions; and to bonded articles produced by those bonding methods.

DESCRIPTION OF BACKGROUND AND RELEVANT MATERIALS

Adhesive compositions are used extensively in bonding natural and synthetic elastomers to themselves, and to other substrates to form laminates and bonded articles. The industrial need for adhesives with the capability to bond such materials is sufficiently great, and the difficulties of achieving such a capability are sufficiently complex, that commercial acceptance of prior art adhesives has frequently represented no more than selection of the least unsatisfactory product.

Quite often, these prior art products have proven useful only for bonding a few specific elastomers to a few specific substrates, and thus are sadly lacking in versatility. Moreover, while many of these products were adequate for use with the elastomers and manufacturing processes in prevailing use at the time of their development, they have become increasingly unsatisfactory as the varieties of new and different synthetic elastomers have multiplied; as the areas in which both natural and synthetic elastomers can be advantageously used have expanded; and as the conditions of use, including temperature, flexibility, load carrying, environmental conditions and the like, have become more severe.

Adhesive compositions which have been employed in the past have included admixtures of chlorinated rubber and at least one polyalkylene polyamine adhesion promoter; mixtures of halogenated ethylene-propylene copolymer and sulfur; mixtures of chlorosulfonated polyethylene, orthoalkoxy aryl diisocyanates and dinitrosobenzene; chlorinated rubber-expoxylated novolak-epoxy resin curing agent admixture; and mixtures including chlorine-containing polymers, polyisocyanates, epoxylated novolaks, gammamethacryloxypropylthimethoxysilane, and dinitrosobenzene.

BRADLEY et al., U.S. Pat. No. 2,459,742, discloses that chlorinated rubber adhesive compositions containing at least one polyalkylene polyamine adhesion promoter can be employed for bonding natural rubber, polychloroprene, polybutadiene, butadiene-styrene copolymer, and butadiene-acrylonitrile copolymer elastomers to substrates such as metals, plastics, textiles and paper.

COLEMAN et al., U.S. Pat. No. 3,258,388, discusses the incorporation of poly-C-nitroso aromatic compounds into conventional rubber-to-metal adhesives to improve bonding. The conventional adhesives into which these compounds may be incorporated include compositions containing thermo-setting condensation polymers; polymers and copolymers of polar, ethylenically unsaturated materials; halogenated rubbers; and polyisocyanates.

DeCREASE et al. U.S. Pat. No. 3,282,883, discloses a class of adhesive compositions for bonding natural and synthetic rubbers, such as ethylene-propylene-nonconjugated diene terpolymers, neoprene, styrene-butadiene rubber, butyl rubber, halobutyl rubber, butadiene-acrylonitrile, halosulfonated polyethylene rubber, polyurethane rubber, and polyacrylate rubber. The rubbers may be bonded to themselves or to other substrates, such as metals. The adhesive compositions disclosed by DeCREASE et al. include chlorosulfonated polyethylene, orthoalkoxy aryl diisocyanates, and dinitrosobenzene.

BARKER, U.S. Pat. No. 3,824,217, discloses combining an oxime compound with an excess of a polyisocyanate compound, so that all oxime groups are reacted with isocyanate. The resulting compound may be used in compositions for bonding rubbers to primed metal substrates.

MANINO, U.S. Pat. No. 3,859,258, discloses employing the oxime-isocyanate reaction product of BARKER in a nonsulfur vulcanization system. The elastomers to which the MANINO vulcanization system may be applied can be bonded to various substrates, including metals, by curing the elastomer in situ on the substrate; priming of the substrate with a polyisocyanate is generally necessary.

WESTLEY, U.S. Pat. No. 4,581,092, discloses a cold-vulcanizable adhesive system for bonding vulcanized rubbers. The system is of particular use in creating durable seams between rubber strips or sheets. The adhesive compositions disclosed in WESTLEY include butyl rubber, a polyisocyanate compound, and at least one of a nitroso compound and an oxime compound, with the oxime compound requiring the additional presence of an oxidizing agent.

GLADDING et al., Canadian Pat. No. 729,596, discloses bonding elastomeric materials to substrates such as metals by utilizing a first adhesive layer of chlorosulfonated polyethylene; a second layer of cured rubber, such as polyisochloroprene, as an interlayer; and a third adhesive composition, including polyisocyanates and/or a polychlorinated natural rubber, to provide an interlayer of rubber-to-metal bond. This system is obviously rather cumbersome.

Russian Pat. No. 717,085 discloses a compound for modifying adhesives based on butyl rubber, which may be used in bonding rubber to metal. The patent teaches that the compound may be produced by reacting quinone dioxime with a polyisocyanate compound, in such a proportion that the ratio of oxime groups to isocyanate groups ranges from just over 1:1 up to 2:1, but does not appear to specifically teach how the compound may be used.

Experience with prior art adhesive systems in this field has revealed that, while they may be useful in bonding vulcanizable elastomers which have a low amount of residual olefinic unsaturation, they suffer from one or more drawbacks when used with more highly unsaturated elastomers; at relatively high cure temperatures; or in lengthy precure heat cycles. In many instances, reactive ingredients such as curing agents and accelerators can prematurely cure the elastomer prior to its contact with the metal substrate, causing mold fouling and, particularly at higher mold temperatures, premature curing of the adhesive. These problems become more severe as the degree of unsaturation of the elastomer increases.

Moreover, prior art systems almost universally require one or more of a dinitroso compound, an oxime compound, a polyisocyanate compound, and an oxidizing agent. The high toxicity of these ingredients poses serious handling and safety problems, and the dinitroso compounds, particularly dinitrosobenzene (DNB), exhibit fuming at relatively high cure temperatures which aggravates the problem of mold fouling. It is also impractical to incorporate an unsaturated film-forming agent into an adhesive compound which includes dinitroso compounds, or an oxime compound used in combination with an oxidizing agent, because these compounds will proceed to react with the unsaturation sites of the film-forming agent, rendering the adhesive composition unusable after a relatively short shelf life.

Thus, there remains a need for new adhesive compositions that are simple, safe, stable, and effective for bonding elastomers with a relatively high degree of unsaturation to themselves and to other substrates, especially at high vulcanization temperatures and in extended precure heat cycles.

SUMMARY OF THE INVENTION

The present invention is directed to a method for reacting an oxime compound with a polyisocyanate compound, such a proportion that the ratio of oxime groups to isocyanate groups exceeds 2:1, with a ratio of about 2.5:1 being most preferred, and is also directed to the adduct produced thereby. The method involves combining an isocyanate compound with a slurry of an aromatic dioxime compound in an inert organic solvent, such as toluene, trichloroethylene, and methylethylketone. Depending on the precise selection and concentration of reactants, the reaction may proceed at room temperature without a catalyst, or may require a catalyst, such as triethylenediamine, and may proceed at slightly elevated temperatures, such as up to about 70° C.

While a wide range of oxime compounds and polyisocyanate compounds may be used in the practice of the present invention, para-benzoquinone dioxime (QDO) and toluene diisocyanate (TDI), respectively, are preferred.

The present invention is further directed to an adhesive composition, which is activatable by heat, incorporating the above-described reaction product in combination with an unsaturated elastomer. In addition, when incorporated into the adhesive composition of the present invention, the oxime compound and polyisocyanate compound may be reacted in such a proportion that the ratio of oxime groups to isocyanate groups equals or exceeds 2:1.

The elastomer used in the adhesive composition should have greater than two mole percent residual olefinic unsaturation, with an unsaturation of at least four mole percent being preferred. Ethylene-propylene-nonconjugated diene terpolymer (EPDM) is most preferred as the elastomer component, with the diene monomer component preferably being 1,4-hexadiene; dicyclopentadiene; 5-ethylidene-2-norbornene; or 5-isopropylidene-2-norbornene. Such EPDM elastomers are common materials of commerce available from several suppliers under a variety of trade names, including Epsyn, from Copolymer Corporation; Nordel, from DuPont; Vistalon, from Exxon; and Royalene, from Uniroyal.

The adhesive composition is particularly noteworthy in that it does not require the presence of an oxidizing agent in order to be effective, and it is free from low-molecular weight, toxic compounds which are likely to be volatile at cure temperatures, thereby presenting a health hazard as well as causing mold fouling.

The present invention further encompasses methods for bonding rubber to metal using the above-described heat-activatable adhesive composition, as well as the bonded articles produced thereby. The methods involve coating the relevant surface of at least one of the substrates to be bonded with the adhesive composition, such as by dipping, spraying, or brushing, and bringing the surfaces into contact under sufficient conditions of time, temperature, and pressure to activate the adhesive composition and effect bonding. Depending on whether the rubber being bonded is cured or uncured, the time for bonding may range from about five minutes to one-hundred and twenty minutes, and the temperature may range from about 90° C. to 200° C.

DESCRIPTION OF PREFERRED EMBODIMENTS

In accordance with the present invention, it has been discovered that compositions comprising at least one ethylene-propylene-nonconjugated diene terpolymer, and at least one adduct of an aromatic dioxime compound and a monomeric isocyanate compound having at least one but preferably two reactive isocyanate groups, are unexpectedly effective in bonding vulcanizable elastomers, particularly elastomers having a relatively low degree of residual olefinic unsaturation, to themselves or to other solid structural substrates. If desired, conventional additives such as fillers, dies, pigments, extenders, and the like can be incorporated into the adhesive compositions of the present invention in amounts conventionally used for such additives, ranging generally from about 0 to 100 parts by weight of the adhesive composition.

The EPDM terpolymer is more particularly characterized by a residual olefinic unsaturation of greater than two mole percent, preferably greater than four mole percent, and the degree of unsaturation may even substantially exceed five mole percent. Most of the ethylene-propylene copolymers (EPM) and terpolymers of ethylene, propylene, and a nonconjugated diene, known in the art as EPDM elastomers, can be employed in forming the novel adhesive compositions of the present invention. The types of EPDM elastomers currently available commercially differ principally with respect to the non-conjugated diene. The dienes most used commercially are 1,4-hexadiene, dicyclopentadiene, 5-ethylidene-2-norbornene, and 5-isopropylidene-2-norbornene. These elastomers are well known in the art and no detailed discussion of their properties or preparation is needed for an understanding of their use in accordance with the invention.

Any aromatic dioxime may be employed to produce the adducts of the invention, including, but not limited to, p-benzoquinone dioxime (QDO), naphthoquinone dioxime, toluquinone dioxime, diphenylquinone dioxime, and diquinoyl dioxime, with QDO being preferred.

Any suitable organic isocyanate can be employed which contains at least one, and preferably at least two, reactive isocyanate groups. Suitable isocyanates include, without limitation, monoisocyanates such as phenylisocyanate; diisocyanates such as toluene diisocyanate (either the 2,4 or 2,6-isomer or a mixture of both) and benzene diisocyanate, as well as dimers and trimers of these diisocyanates; methylene/bis(4-phenylisocyanate) and the corresponding saturated compound methylene/bis(4-cyclohexylisocyanate); and higher polyisocyanates, including the polyisocyanate of hexamethylenediamine urea condensate and polymethylenepoly(phenylisocyanate). Toluene diisocyanate (TDI) is preferred.

The dioxime-isocyanate adduct is more particularly characterized by the presence of at least one, and preferably two or more, oxime functional groups and by the substantial absence of a reactive isocyanate group. This follows from the fact that, during formation of the adduct, all of the isocyanate groups of the isocyanate moiety are reacted with the oxime, which is accomplished by defining the molar ratio of the dioxime moiety to the polyisocyanate moiety in the reaction mix as greater than 2:1, with a ratio of about 2.5:1 being preferred. When the adduct is to be employed in the adhesive compositions of the present invention, the ratio of oxime groups to isocyanate groups in the reaction mix may equal or exceed 2:1, with a ratio of about 2.5:1 being preferred.

Generally, the dioxime-isocyanate adduct will be present in the adhesive composition in an amount of from about 2 to about 50 parts by weight per 100 parts by weight of the terpolymer, and preferably in the range of from about 10 to about 40 parts by weight per 100 parts by weight of the terpolymer.

The dioxime-isocyanate adducts can be produced by adding the aromatic dioxime and polyisocyanate together in the presence of a reaction medium such as an inert organic liquid; toluene, trichloroethylene, or methyl ethyl ketone are preferred because of their ready commercial availability. This may be done, for example, by rapidly adding the isocyanate compound to a slurry of the aromatic dioxime in inert organic liquid. Alternatively, a slurry of the aromatic dioxime in inert organic liquid may be added slowly to a solution of the isocyanate compound in inert organic solvent. Typically, the solid reactants are present in the reaction mixture in an amount of from about 5-60% by weight, with a range of from about 10-20% by weight being most preferred.

In order to achieve complete reaction of the oxime groups of the dioxime with the isocyanate, an excess of aromatic dioxime is employed. In general, the molar ratio of the dioxime reactant to the isocyanate reactant should be greater than 2:1, and is preferably about 2.5:1. In this way, the essential stoichiometric proportion of oxime group to isocyanate is always obtained.

While not essential, a suitable catalyst, such as triethylenediamine, dibutyltin dilaurate, stannous octoate, or other catalysts may be employed in the reaction at a suitable concentration, such as approximately one percent.

The solid reaction product may be separated from the liquid reaction medium by any suitable means such as filtration; washed with a suitable inert organic solvent, such as toluene, trichloroethylene, or methyl ethyl ketone, to remove any unreacted polyisocyanate; and dried by conventional means, such as in a vacuum oven. It will be obvious to those skilled in the art that the reactants, reaction medium, reaction vessel, and washing liquid should be free from water, since the isocyanate group reacts with water.

Alternatively, a fine suspension of the reaction product may be produced by grinding the reaction mixture in a sand mill, Kady mill, ball mill, or other suitable grinding instrument. In this way, the solid adduct does not have to be isolated.

The reaction conditions will vary somewhat, as would be expected, depending upon the relative reactivity of the reactants, whether or not a catalyst is employed, the concentration of the reactants and catalyst, and so forth. With some reactants the reaction will proceed at room temperature and go to completion in a short time without a catalyst, whereas with other reactants it may be necessary to employ a catalyst and conduct the reaction at somewhat elevated temperatures, up to about 70° C., in order to complete the reaction in a convenient time period. Selection of the precise conditions for a reaction using a given set of reactants will not present difficulties to one of ordinary skill in the art.

Preferably, the composition will be compounded with an appropriate inert solvent or diluent to provide an adhesive lacquer. Toluene, trichloroethylene, or methyl ethyl ketone are preferred because of their availability. The lacquer will have a viscosity of from about 25 to about 5,000 centipoises, and preferably from about 50 to 250 centipoises, at a total solids content of from about 3 to about 90 percent, preferably of from about 3 to about 70 percent, and most preferably of from about 5 to 30 percent.

Any suitable anhydrous inert organic liquid may be employed as the reaction medium, solvent, or washing liquid. As previously stated, toluene, trichloroethylene, and methyl ethyl ketone are preferred because of their ready availability.

If desired, conventional additives such as are normally used in adhesive compositions, e.g., fillers, colorants, extenders, and the like, can be included in the adhesive compositions of the present invention in amounts conventionally used for such additives. Optionally, the adhesive compositions of the invention can include from about 0.5 to about 200 percent by weight, per 100 parts by weight of terpolymer, of at least one halogenated compound such as chlorinated rubber or chlorosulfonated polyethylene.

The adhesive compositions are applied to substrate materials in any conventional manner, such as by dipping, spraying, brushing, and the like. Preferably, after being coated the substrate surfaces are allowed to dry before being brought together. After the surfaces have been pressed together with the adhesive layer between, the assembly is heated in accordance with conventional practices. The exact condition selected will depend upon the particular elastomer being bonded and on whether or not it is cured. If the rubber is uncured and curing is to be effected during bonding, the conditions will be dictated by the rubber composition and will generally be at a temperature of from about 140° C. to about 200° C., for from about five to about sixty minutes. If the rubber is already cured the bonding temperature may range from about 90° C. to about 180° C., for from about fifteen minutes to about one hundred and twenty minutes.

The pressure employed in contacting the substrate surfaces is not critical, and in general may be simply that amount of pressure necessary to keep the substrate surfaces in firm contact while bonding takes place. The pressures typically encountered in compression, transfer, or injection molding operations are quite suitable to the practice of the present invention, and a pressure of anywhere from 0 to 3,000 psi is acceptable.

The compositions of the present invention are characterized by an unexpected ability to provide exceptially strong rubber-to-metal bonds without the necessity of first priming the metal surface; however, the use of conventional substrate primer compositions does enhance the strength of the adhesive bond. Thus, the compositions of this invention are effective as one-coat adhesive materials, particularly for elastomers such as EPDM, EPR (ethylene-propylene rubber), IIR (isobutyleneisopropylene rubber), NR (natural rubber), Cl-IIR (chlorobutyl rubber), SBR (styrene-butadiene rubber), and blends thereof; and, as two-coat adhesive materials when used with conventional substrate primers, with the preferred primer being Chemlok 205, manufactured by Lord Corporation.

A wide range of metal substrates may be used for rubber-to-metal bonding using the adhesive compositions of the present invention, including grit blasted steel, cold-rolled steel, aluminum, and zinc-phosphatized steel.

Besides providing excellent primary adhesion, the compositions of the present invention exhibit an exceptionally long shelf life, excellent resistance to sweeping during transfer-type molding operations, and outstanding stability at environmental conditions of use. The compositions are particularly noteworthy in that they do not require any oxidizing agent because they do not function through the formation of dinitrosobenzene, thereby eliminating the fuming and mold fouling problems caused by dinitrosobenzene or low-molecular weight free oxime compounds at curing temperatures.

The present invention may be more fully understood and appreciated by reference to the following examples, which are provided for purposes of illustration only. It is to be understood that the invention is not limited to the examples nor to the specific details therein enumerated. In the examples, amounts are parts by weight, unless otherwise specified.

The dioxime-polyisocyanate adducts of the present invention may be prepared as follows:

EXAMPLE A

TDI/QDO ADDUCT 3,700 ml of methyl ethyl ketone (MEK) are charged to a 5 liter reactor. After distilling off 50 ml of the MEK, 368 grams (2.67 moles) of QDO are added. The mixture is heated to 75° C., and 232 grams (1.33 moles) of TDI are slowly added, over a one-half hour period. The reaction mixture is next heated at 75°-80° C. for about three hours, until the percent of NCO groups present in the reaction mix is equal to or less than 0.1. An equal volume, of about 3,700 ml, of toluene is added to this reaction mixture. The solid product which then precipitates is filtered and dried to yield 410 grams of a brown-green powder, for a yield of 68 percent.

EXAMPLE B

TDI/QDO ADDUCT SLURRY

To a 5 liter reactor was charged 3,700 ml of methyl ethyl ketone (MEK) and 368 grams (2.67 moles) of QDO. Approximately 100 ml of MEK was removed by distillation, and 232 grams (1.33 moles) of TDI was then added in four equal portions over a period of 1.5-2.0 hours. The reaction mixture was then heated at 75°-80° C. for an additional hour, and the remaining isocyanate content (less than 0.1 percent) was measured by standard titration. The reaction mixture was removed and ground into a fine dispersion by a standard sand mill process. Solids totalled twenty percent.

The following examples relate to specific formulations of the adhesive compositions of the present invention, and further describe the effectiveness of those adhesive compositions when tested as shown. In the following examples, commercial butyl compounds A and B, which were the rubbers used to test the effectiveness of the adhesive compositions of the present invention, are proprietary, customer-supplied butyl rubber samples, whose precise compositions are not critical for purposes of the examples. The QDO/TDI adduct used in Examples C and D is the adduct prepared by either of the procedures given in Examples A and B.

EXAMPLE C

Adhesive Formulation A Tested With Commercial Butyl Compounds A and B

| Dry Weight (parts, per hundred) | Formulation A Ingredient | Wet Weight |
|---|---|---|
| 52.0 | FEF Carbon Black | 52.0 |
| 11.6 | QDO/TDI adduct @ 20% in toluene | 58.0 |
| 36.4 | Epsyn 55 EPDM @ 16% in naphtha | 277.5 |
| 100.0 | Naphtha/toluene 1:1 | 376.8 |

Formulation A is prepared as follows: the solution of Epsyn 55 EPDM in naphtha-toluene blend is added to a fine dispersion of QDO-TDI adduct prepared by processing on a Kady mill, ball mill, or sand mill. This mixture is further dispersed by milling to a grind of approximately 1-2 mil on a grind gauge.

The following bonding results were obtained:

Commercial Butyl Compound A

Cure Conditions: Precure heating 4 minutes @ 320° F.
Cure 20 mins. @ 320° F. to zinc phosphatized substrate
Test Method: ASTM D-429A, 1-in./min., room temperature

| Sample | Peak Stress at break, psi | % Rubber Retention* |
|---|---|---|
| 1 | 614 | 98 |
| 2 | 689 | 99 |
| 3 | 661 | 100 |
| Avg. | 654 | 99 |

Commercial Butyl Compound B

Cure Conditions: Precure heating 4 minutes @ 320° F.
Cure 28 mins. @ 320° F. to zinc phosphatized substrate
Test Method: ASTM D-429A, 1-in./min., room temperature

| Sample | Peak Stress at break, psi | % Rubber Retention* |
|---|---|---|
| 1 | 637 | 95 |
| 2 | 596 | 90 |
| 3 | 666 | 95 |
| Avg. | 633 | 93 |

*Percent rubber retention refers to the percent of the adhered substrate area which retains rubber after the bonded substrate assembly has been tested on an Instron test instrument.

EXAMPLE D

Adhesive Formulation B Tested With Commercial Butyl Compounds A and B

| Dry Weight (parts per hundred) | Formulation B Ingredient | Wet Weight |
|---|---|---|
| 45.0 | FEF Carbon Black | 45.0 |
| 10.0 | QDO/TDI adduct | 50.0 |

-continued

Formulation B

| Dry Weight (parts per hundred) | Ingredient | Wet Weight |
|---|---|---|
| 13.5 | @ 20% in toluene Hypalon 40 @ 20% in toluene | 67.5 |
| 31.5 | Epsyn 55 EPDM | 196.9 |
|  | Naphtha/toluene 1:1 | 363.0 |
| 100.0 |  |  |

Formulation B is prepared similarly to Formulation A in Example C, except that Formulation B includes, as an additional ingredient, a toluene solution of Hypalon 40 (chlorosulfonated polyethylene).

Formulation B gives slightly inferior performance compared to Formulation A, but affords a harder, tougher film than Formulation A. The following bonding results were obtained.

Commercial Butyl Compound A

Cure Conditions: Precure heating 4 minutes @ 320° F.
Cure 20 mins. @ 320° F. to zinc phosphatized substrate
Test Method: ASTM D-429A, 1-in./min., room temperature

| Sample | Peak Stress at break, psi | % Rubber Retention* |
|---|---|---|
| 1 | 663 | 99 |
| 2 | 614 | 85 |
| 3 | 642 | 100 |
| Avg. | 640 | 95 |

Commercial Butyl Compound B

Cure Conditions: Precure heating 4 minutes @ 320° F.
Cure 28 mins. @ 320° F. to zinc phosphatized substrate
Test Method: ASTM D-429A, 1-in./min., room temperature

| Sample | Peak Stress at break, psi | % Rubber Retention* |
|---|---|---|
| 1 | 407 | 50 |
| 2 | 583 | 85 |
| 3 | 463 | 50 |
| Avg. | 484 | 62 |

*Percent rubber retention refers to the percent of adhered substrate area retaining rubber after testing the bonded substrate assembly on an Instron test instrument.

What we claim is:

1. A composition of matter, comprising:
   (a) an ethylene-propylene-diene terpolymer having a degree of unsaturation of at least four mole percent; and
   (b) an adduct of a dioxime and a polyisocyanate, said adduct being formed by the process of reacting a dioxime compound and an isocyanate compound in proportion to each other such that the ratio of oxime groups to isocyanate groups is greater than 2:1, whereby said composition of matter is essentially free of unreacted isocyanate functionality.

2. The composition of matter as defined by claim 1, further comprising essentially no oxidizing agent.

3. The composition of matter as defined by claim 1, wherein said diene is selected from the group consisting of 1,4-hexadiene; dicyclopentadiene; 5-ethylidene-2-norbornene; and 5-isopropylidene-2-norbornene.

4. The composition of matter as defined by claim 1, wherein said ratio of oxime groups to isocyanate groups is about 2.5:1.

* * * * *